Jan. 5, 1954   R. P. GANZMANN   2,664,803
POWER PULVERIZING PLOW
Filed June 6, 1951   3 Sheets-Sheet 1

Robert P. Ganzmann
INVENTOR.

BY *Clarence A. O'Brien*
*and Harvey B. Jacobson*
Attorneys

Jan. 5, 1954     R. P. GANZMANN     2,664,803
POWER PULVERIZING PLOW
Filed June 6, 1951     3 Sheets-Sheet 2
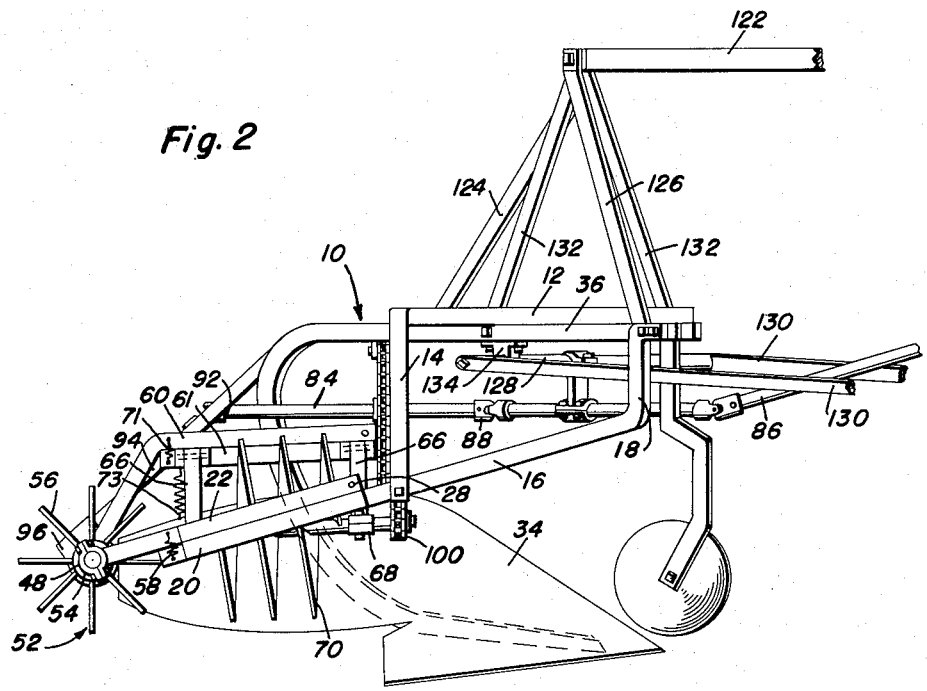
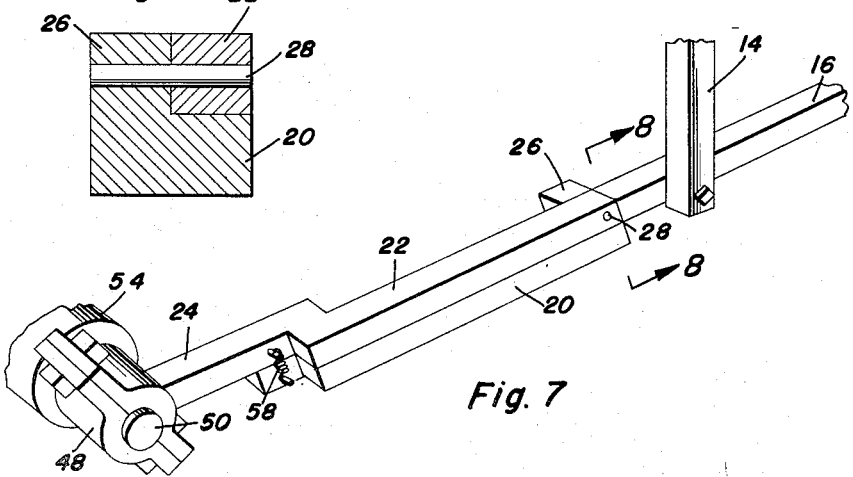
Robert P. Ganzmann
INVENTOR.
BY Clarence A. O'Brien
and Harvey B. Jacobson
Attorneys

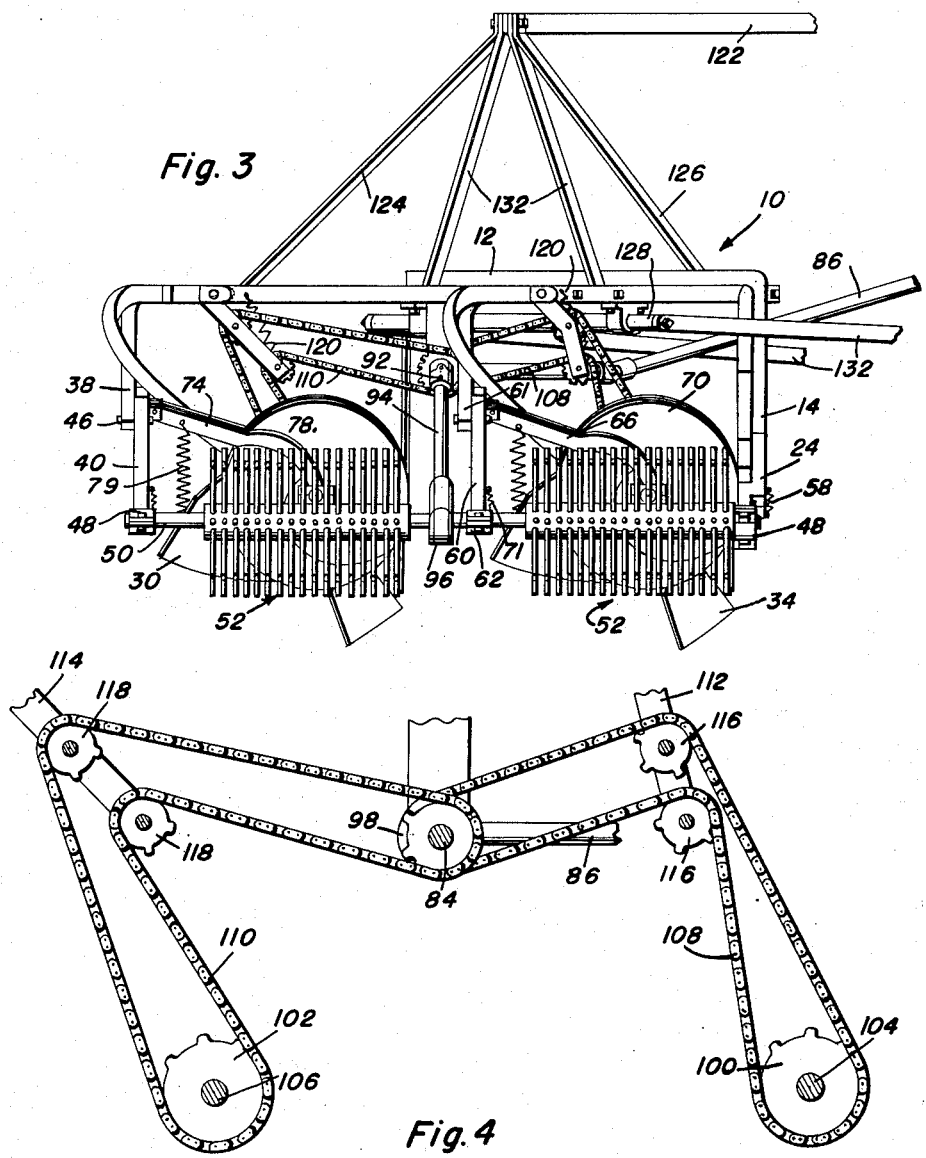

Patented Jan. 5, 1954

2,664,803

UNITED STATES PATENT OFFICE 2,664,803

POWER PULVERIZING PLOW

Robert P. Ganzmann, Little Falls, N. Y.

Application June 6, 1951, Serial No. 230,190

6 Claims. (Cl. 97—35)

This invention relates to new and useful improvements in plows and the primary object of the present invention is to provide a plow that will plow, disk harrow, and drag, or spike tooth harrow, all in one operation, thereby permitting a farmer to till his soil by going over the ground once instead of three or four times as is the usual method.

Another important object of the present invention is to provide a power pulverizing plow including a pair of power driven screws that are mounted on a frame for vertical swinging movement in response to rocks or the like objects engaged by the screws as the frame is pulled over the ground.

A further object of the present invention is to provide a power pulverizing plow including a pair of spaced parallel screws and a pair of spider-like pulverizers disposed transversely of and behind the screws and operatively connected to the screws and to a source of power for unitary rotation of the screws and pulverizers.

A still further aim of the present invention is to provide a power pulverizing plow that is extremely simple and practical in construction that may be quickly and readily attached to a tractor to be operated from the power take-off shaft of the tractor.

Other objects and advantages reside in the details of construction and operation as more fully hereinafter described and claimed, reference being had to the accompanying drawings forming part hereof, wherein like numerals refer to like parts throughout, and in which:

Figure 2 is a side view taken in the direction of arrow numbered 2 in Figure 1;

Figure 3 is a rear elevational view taken substantially in the direction of arrow numbered 3 in Figure 1;

Figure 4 is an enlarged vertical sectional view taken substantially on the plane of section line 4—4 of Figure 1;

Figure 7 is a fragmentary perspective view of the frame to show the manner in which the pulverizers are mounted on the frame; and Figure 8 is a vertical sectional view taken substantially on the plane of section line 8—8 of Figure 7.

Figure 1:
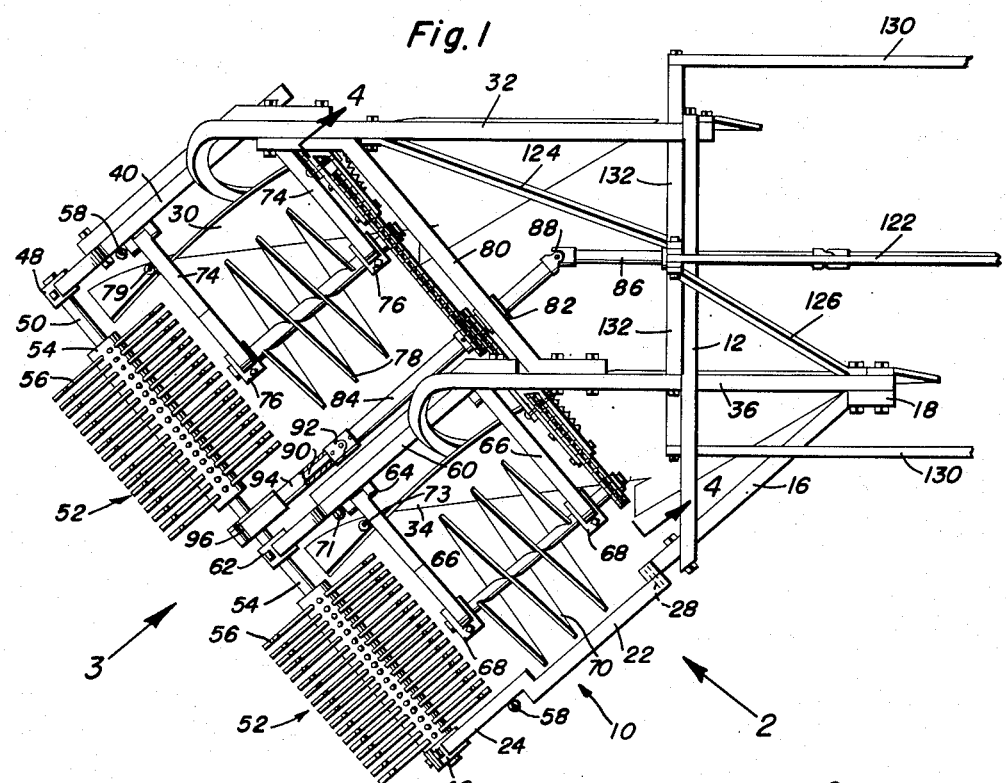
Figure 1 is a plan view of the present invention applied to the rear of a tractor.
Figure 6:
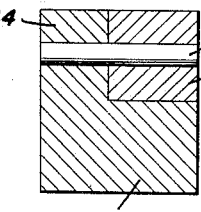
Figure 6 is a vertical sectional view taken substantially on the plane of section line 6—6 of Figure 5.
Figure 5:
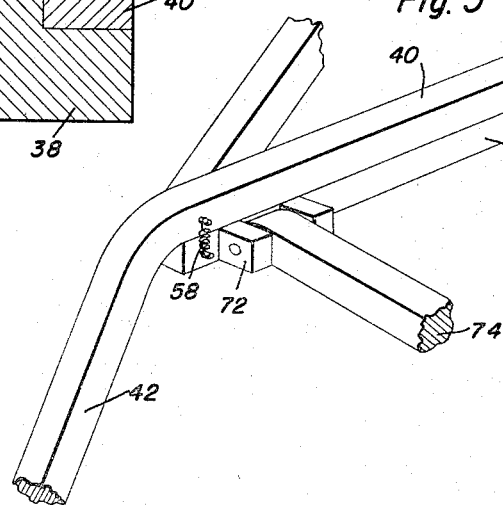
Figure 5 is a fragmentary perspective view of the frame forming part of the invention and showing the manner in which the screws are mounted for vertical swinging movement.

Referring now to the drawings in detail, wherein, for the purpose of illustration, there is disclosed a preferred embodiment of the present invention, the numeral 10 represents a frame including an L-shaped member having a horizontal leg portion 12 and a vertical leg portion 14.

The lower end of the leg portion 14 is secured to an intermediate portion of a side member 16 whose forward end is provided with an upwardly extending extension 18. The rear portion of the member 16 is formed with an offset 20 that underlies the forward offset portion 22 of a rearwardly extending arm 24. The offset portion 22 is pivoted to an ear 26 rising from the member 16 by a horizontal pivot 28.

A plowshare 30 is provided with a supporting shank including a horizontal portion 32 whose forward end is secured to the horizontal leg portion 12. A second plowshare 34 is disposed alongside of plowshare 30 and includes a supporting shank having a horizontal portion 36 that extends under the leg portion 12 and whose forward end is secured to the extension 18.

A second side member 38 is secured to the leg portion 12 and underlies an arm 40 having a rearwardly and downwardly extending end portion 42. The member 38 includes an upstanding ear 44 to which the forward end of arm 40 is pivoted by a horizontal pivot 46.

Split bearings 48 are mounted on the rear ends of the arms 24 and rotatably support the ends of a shaft 50 on which a pair of spider-like pulverizers 52 are mounted. The pulverizers 52 include sleeve portions 54 and radially projecting longitudinally and circumferentially spaced wire fingers 56 carried by the sleeve portions 54.

The rear ends of the arms 24 and 40 are connected to the side members 20 and 38 by springs 58 that restrict upward swinging movement of the arms 24 and 40 about their pivots 28 and 46. However, should the pulverizers engage obstacles, the springs 58 will permit upward swinging movement of the arms 24 and 40.

A vertically swingable cross-member 60 forms part of the frame 10 and parallels the members 16 and 38. The rear end of the member 60 curves downwardly and rotatably supports a bearing 62 for the shaft 50. The forward end of the member 60 is pivoted to a rigid frame member 61. Pairs of ears 64 project laterally from the member 61 and the inner ends of arms 66 are pivoted between the ears 64 of each pair by horizontal pins. The outer ends of the arms 66 carry bearings 68 that rotatably support the ends of a screw 70. The members 60 and 61 are connected by a spring 71 and the arms 66 are connected to plowshare 34 by springs 73.

Pairs of ears 72 project laterally from the member 38 and toward the member 60. The inner ends of a pair of arms 74 are pivoted between the pairs of ears 72 by horizontal pins and the outer ends of the arms 74 carry bearings 76 that rotatably support a second screw 78 paralleling the screw 70. The arms 74 are connected to the plowshare 30 by springs 79.

The spaced parallel horizontal portions 32 and 36 of the plowshares 30 and 34 are joined by a brace 80 that carries a bearing 82 intermediate its ends. A shaft 84 is rotatably supported in the bearing 82. The forward end of shaft 84 is connected to the power take-off shaft 86 or extension thereof of a tractor by a universal coupling 88 and the rearward end of the shaft 84 is connected to another shaft 90 by a universal coupling 92. The shaft 90 carries a worm (not shown) that meshes with a gear (not shown) on the intermediate portion of the shaft 50. The shaft 90 is positioned in a hollow arm 94 that projects outwardly from a housing 96. The housing 96 rotatably supports the shaft 50 and houses the intermeshing worm and gear.

Sprockets 98 are mounted on the shaft 84 and the sprockets 98 are connected to sprockets 100 and 102 on the supporting shafts 104 and 106 of the screws 70 and 78 by endless sprocket chains 108 and 110. A pair of vertically swingable brackets 112 and 114 are mounted on the horizontal portion 36 and the brace 80 and carry upper and lower pairs of sprockets 116 and 118 over which the upper and lower flights of the chains 108 and 110 are engaged. Springs 120 connect the brackets 112 and 114 to the portion 36 and brace 80 to yieldingly retain the brackets raised and the chains 108 and 110 tensioned.

The tractor is provided with a draft bar 122 that is connected to the portion 32 by a vertically inclined brace 124. The draft bar 122 is connected to the forward end of portion 36 by a vertically inclined brace 126. The draft bar 122 is also connected to the cross-bar 128 between the tractor lift arms 130 by upwardly converging braces 132.

The horizontal portion 12 extends over the arms 130 and overlies the bar 128. The screws 70 and 78 are inclined relative to the direction of travel of the tractor and the shaft 50 is disposed perpendicular to the screws 70 and 78 and behind the screws 70 and 78 so that the pulverizers 52 will receive soil leaving the screws 70 and 78.

As the tractor is moved forwardly, the plowshares 30 and 34 will direct soil toward the screws 78 and 70, and the pulverizers 52 will receive the soil leaving the screws 70 and 78.

Should the screws 70 and 78 engage obstacles, they may swing upwardly due to the mounting of the arms 66 and 74 and this is likewise true of the pulverizers, since the arms 22 and 40 may also swing upwardly on their pivots 28 and 46.

Portion 36 carries a bearing 134 for the bar 128 and the portion 32 carries a similar bearing for the bar 128.

Having described the invention, what is claimed as new is:

1. A power pulverizing plow comprising a frame, a pair of spaced parallel screws mounted on said frame for rotation, a pair of spider-like pulverizers mounted for rotation on said frame behind said screws and disposed transversely across said screws, a driven member operatively connected to said screws and said pulverizers for rotating the same, and plows supported on the frame in front of the screws for directing soil toward said screws, said frame including pairs of spaced parallel vertically swingable arms rotatably supporting the screws, and spring means urging said arms downwardly toward the ground.

2. A power pulverizing plow comprising a frame, a pair of spaced parallel screws mounted on said frame for rotation, a pair of spider-like pulverizers mounted for rotation on said frame behind said screws and disposed transversely of said screws, a driven member operatively connected to said screws and said pulverizers for rotating the same, and plows supported on the frame for directing soil toward said screws, a pair of vertically swinging arms disposed longitudinally of said screws and forming part of said frame, said arms rotatably supporting said pulverizers.

3. A power pulverizing plow comprising a frame, a pair of spaced parallel screws mounted for rotation on the frame, pairs of spaced parallel vertically swingable arms forming part of the frame and rotatably supporting the screws, spring means urging the arms toward the ground, a vertically swingable support forming part of the frame and including a rotatable shaft disposed transversely of the screws and behind the screws, a pair of spider-like pulverizers mounted on the shaft behind the screws, and a driving member operatively connected to said shaft and said screws for rotating the same as a unit.

4. The combination of claim 3 and plowshares mounted on the frame alongside of said screws for directing soil toward the screws.

5. A power pulverizing plow comprising a frame including pairs of spaced parallel vertically swingable arms, a screw rotatably supported on each pair of arms, said screws being spaced parallel to each other, a pair of rearwardly extending vertically swingable arms forming part of the frame and extending transversely across said pairs of arms, a shaft rotatably supported on the rear ends of said rearwardly extending arms and disposed behind the screws, a pair of spider-like pulverizers mounted on the shaft behind the screws, a driving shaft operatively connected to the shaft and to the screws, plows mounted on the frame alongside said screws for directing soil toward the screws, and springs connecting the plows to the screw supporting arms and urging the screws toward the ground.

6. A power pulverizing plow comprising a frame including pairs of spaced parallel vertically swingable arms, a screw rotatably supported on each pair of arms, said screws being spaced parallel to each other, a pair of rearwardly extending vertically swingable arms forming part of the frame and extending transversely across said pairs of arms, a shaft rotatably supported on the rear ends of said rearwardly extending arms and disposed behind the screws, a pair of spider-like pulverizers mounted on the shaft behind the screws, a driving shaft, endless sprocket chains operatively connecting said driving shaft to said screws, vertically swingable brackets mounted on said frame, and sprockets on said brackets engaging said chains.

ROBERT P. GANZMANN.

References Cited in the file of this patent

UNITED STATES PATENTS

| Number | Name | Date |
|---|---|---|
| 1,113,684 | Phillips | Oct. 13, 1914 |
| 1,718,564 | Kietzke | June 25, 1929 |
| 2,244,538 | Kasten | June 3, 1941 |
| 2,420,500 | Schug | May 13, 1947 |
| 2,547,585 | Lewis | Apr. 3, 1951 |